Jan. 5, 1937.  G. W. SWIFT, JR  2,066,587
EGG TRAY
Filed March 13, 1935
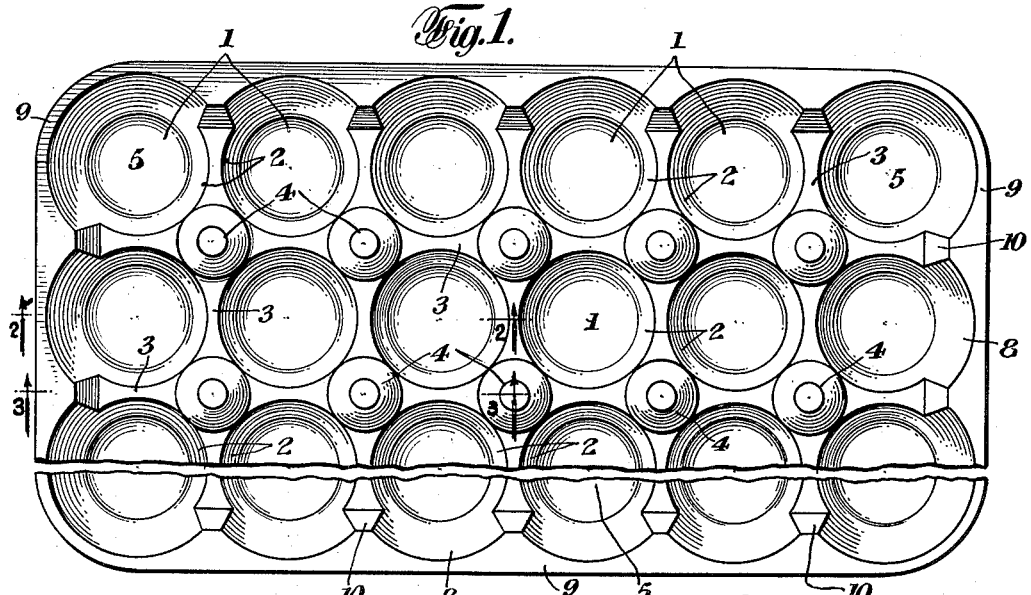
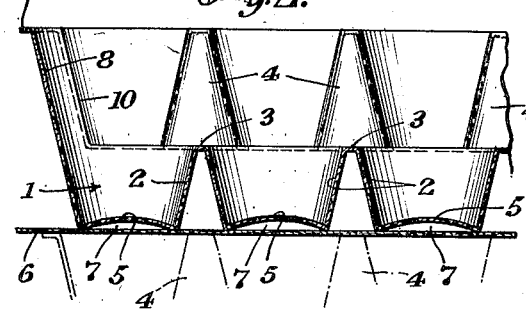
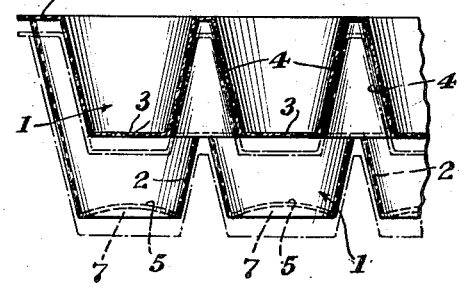
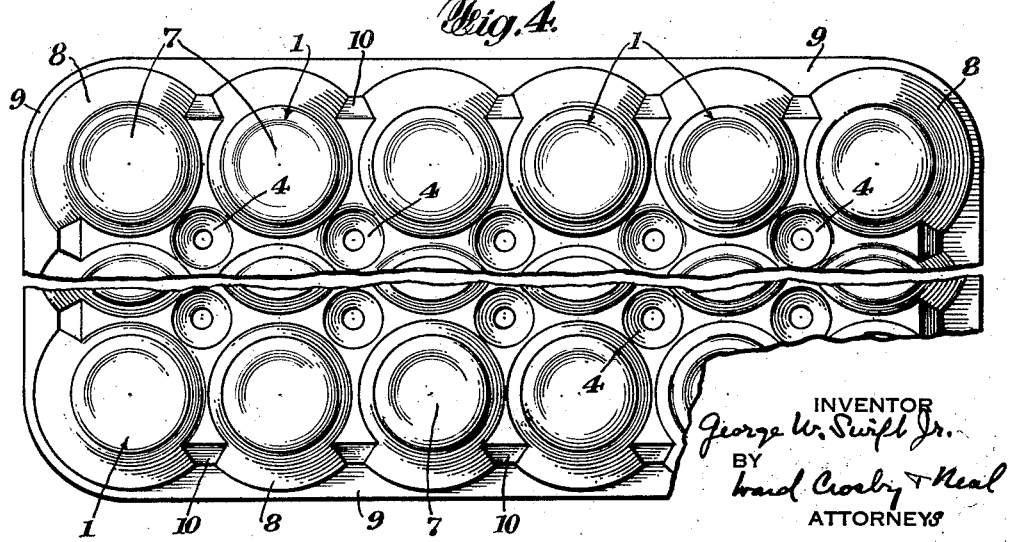
INVENTOR
George W. Swift Jr.
BY
Ward Crosby & Neal
ATTORNEYS Patented Jan. 5, 1937

2,066,587

UNITED STATES PATENT OFFICE 2,066,587

EGG TRAY

George W. Swift, Jr., Bordentown, N. J., assignor to George W. Swift, Jr. Inc., Bordentown, N. J., a corporation of New Jersey Application March 13, 1935, Serial No. 10,788

2 Claims. (Cl. 217—26.5)

This invention relates to a tray or container for eggs, fruit, glassware and other easily injured products, during shipment or storage, or like purposes, the tray being of the same general type as described in my prior Patents Nos. 1,857,984 dated May 10, 1932 and 1,983,325 dated December 4, 1934. It is highly important that egg trays of the above type be capable of being nested exceedingly closely and compactly in order that a maximum number of the trays may be shipped or stored for use within a minimum space. The present invention aims to provide a tray construction having markedly improved qualities in the above respects, and also reducing the likelihood of injury to the trays in nesting or separating them, and enabling them to be separated with greater facility from nested relation. Another object of the invention is to provide a tray construction which will protect the eggs better against breakage due to sudden impacts of the eggs against the bottoms or tops of the receptacles which carry them. Further objects and advantages of the invention will be in part obvious and in part specifically referred to in the description hereinafter contained which, taken in conjunction with the accompanying drawing, discloses a preferred embodiment of the invention; such embodiment, however, is to be regarded as merely illustrative of the principles of the invention. In the drawing—

Fig. 1 is a top plan view of an egg tray constructed in accordance with the invention.

Figs. 2 and 3 are vertical sections taken on lines 2—2 and 3—3 of Fig. 1 looking in the direction of the arrows. Fig. 2 also shows how trays constructed in accordance with the invention may be stacked up when filled, with spacer sheets between them, and Fig. 3 indicates how the trays when empty, may be nested together.

Fig. 4 is a bottom view of the tray.

The tray is preferably made of pulp or similar fibres suitably formed into the desired shape, for example as described in my Patent No. 1,983,324 dated December 4, 1934, the resulting product being in the nature of a thin cardboard or paper board. The particular method to be used in forming the tray however is not a part of nor essential to the present invention.

In accordance with the present invention, the tray is so shaped as to provide a plurality of egg-receiving receptacles 1 disposed side by side and substantially circular in cross section, these receptacles being preferably about half the longer dimension of an egg in height, and their sidewalls 2 being flared upwardly as shown most plainly in Fig. 2, so that when eggs are placed in the container with their longer axes substantially vertical, the lower ends of the eggs will be fairly closely confined in the receptacles. I prefer to construct these sidewalls 2 substantially in inverted frustro-conical shape, and the walls of adjacent receptacles at the mouths of the receptacles are almost tangent to each other, although preferably narrow horizontal bridge walls 3 are provided between them. These bridge walls 3 reinforce the structure markedly against distortion under the stresses applied in use.

At points between adjacent clusters of the receptacles 1, I provide a plurality of hollow posts 4 which project upwardly above the mouths of receptacles 1 sufficiently to insure that the tops of the eggs will not extend above the tops of the posts. These posts 4 are made substantially conical or frustro-conical in shape and their bases preferably are of such size as to be substantially tangent to the mouths of adjacent receptacles. It is preferable also that the conicity of the posts 4 be substantially the same as that of receptacles 1, where receptacles of frustro-conical shape are employed. The under face of the tray is substantially complementary in shape to its upper face as above described, whereby a large number of the trays may be nested together.

I have found, as is indicated by the dotted lines in Fig. 3, that the use of posts 4 of conical shape in conjunction with the receptacles 1, markedly increases the number of the recepacles which may be nested within a given space. These posts 4 may be formed much more precisely in shape, and therefore fit much more closely and accurately than is possible with posts of angular cross section, where it is not practical to construct the corners, edges and faces accurately enough to insure close fitting in nesting. The posts 4 of the present invention are also less likely to be injured in nesting the trays or separating them from nested relation, and the trays may be separated with greater facility due to the smooth regularity of the engaging surfaces.

The bottom walls of the receptacles 1 preferably are convexly dished at their inner portions 5 as best shown in Fig. 2, thus raising their inner portions 5 above the level of the points of juncture of the bottom and side walls of receptacles 1. The inner portions 5 of the receptacle bottom walls are made sufficiently thin to be resilient and provide a yielding cushion under impact of eggs against them. Fig. 2 for example, shows in dotted lines a bottom tray of the character above described which is separated from the upper tray shown in full lines, by a spacer sheet 6, and thus if eggs be dropped into the receptacles 1 of the upper tray, the inner portions 5 of the receptacle bottoms will form a cushion preventing the lower ends of the eggs from breaking by impact against the spacer sheet 6. Or if, due to jarring or sudden shock, the upper ends of the eggs in the receptacels 1 of the lower tray should be impacted against the under surface of the spacer sheet 6, the sheet 6 may flex into the spaces 7 (Fig. 2) under the dished portions 5 above described; thus the eggs are cushioned both at the top and bottom.

The posts 4 permit the upper parts of the eggs to shift laterally to some extent but not sufficiently to break against each other, and these posts also serve as supports for the spacer sheets 6. Preferably the side walls 2 at the edges of the tray are extended upwardly as indicated at 8 (Fig. 2) to the level of the tops of posts 4. The upper ends of walls 8 may also be provided with an outwardly supported flange 9 extending around the edge of the tray to support a spacer sheet 6. As shown in Fig. 1 it will be noted that this flange 9 may be somewhat wider in between adjacent receptacles, and connected to the horizontal walls 3 above described by diagonal walls 10.

While a specific embodiment of the invention has been disclosed, it should be understood that changes in the construction may be made, within the scope of the appended claims.

I claim:

1. A tray of the class described having its walls shaped to provide in its upper face a plurality of article receiving receptacles disposed side by side, the mouths of said receptacles lying substantially in a horizontal plane which is at an intermediate level in the tray, and substantially conical hollow posts projecting upwardly from points between adjacent clusters of said receptacles, the bases of said posts lying substantially in the aforesaid plane and being substantially tangent to the mouths of adjacent receptacles, said bases of the posts being substantially smaller in cross-section than the article receiving receptacles whereby the posts do not receive within them the articles to be packed, said tray being provided with horizontal bridge walls lying substantially in said plane and extending between adjacent receptacles and between adjacent posts to brace the structure against distortion, and an outer flange extending upwardly from the outer walls of the outer receptacles and encircling the space between the mouths of the receptacles and the upper portions of the post.

2. A tray of the class described having its walls shaped to provide in its upper face a plurality of upwardly flaring substantially frustro-conical article receiving receptacles disposed side by side, the mouths of said receptacles lying substantially in a horizontal plane which is at an intermediate level in the tray, and substantially conical hollow posts projecting upwardly from points between adjacent clusters of said receptacles, the bases of said posts lying substantially in the aforesaid plane and being substantially tangent to the mouths of adjacent receptacles, said bases of the posts being substantially smaller in cross-section than the article receiving receptacles whereby the posts do not receive within them the articles to be packed, said tray being provided with horizontal bridge walls lying substantially in said plane and extending between adjacent receptacles and between adjacent posts to brace the structure against distortion, the under face of the tray being substantially complementary in shape to its upper face, and the bottom walls of said receptacles being convexly dished to raise the inner portions thereof above the points of juncture of their bottom and side walls, said inner portions being resilient to provide a yielding cushion under impact of the articles against them, and an outer flange extending upwardly from the outer walls of the outer receptacles and encircling the space between the mouths of the receptacles and the upper portions of the post.

GEORGE W. SWIFT, Jr.